UNITED STATES PATENT OFFICE.

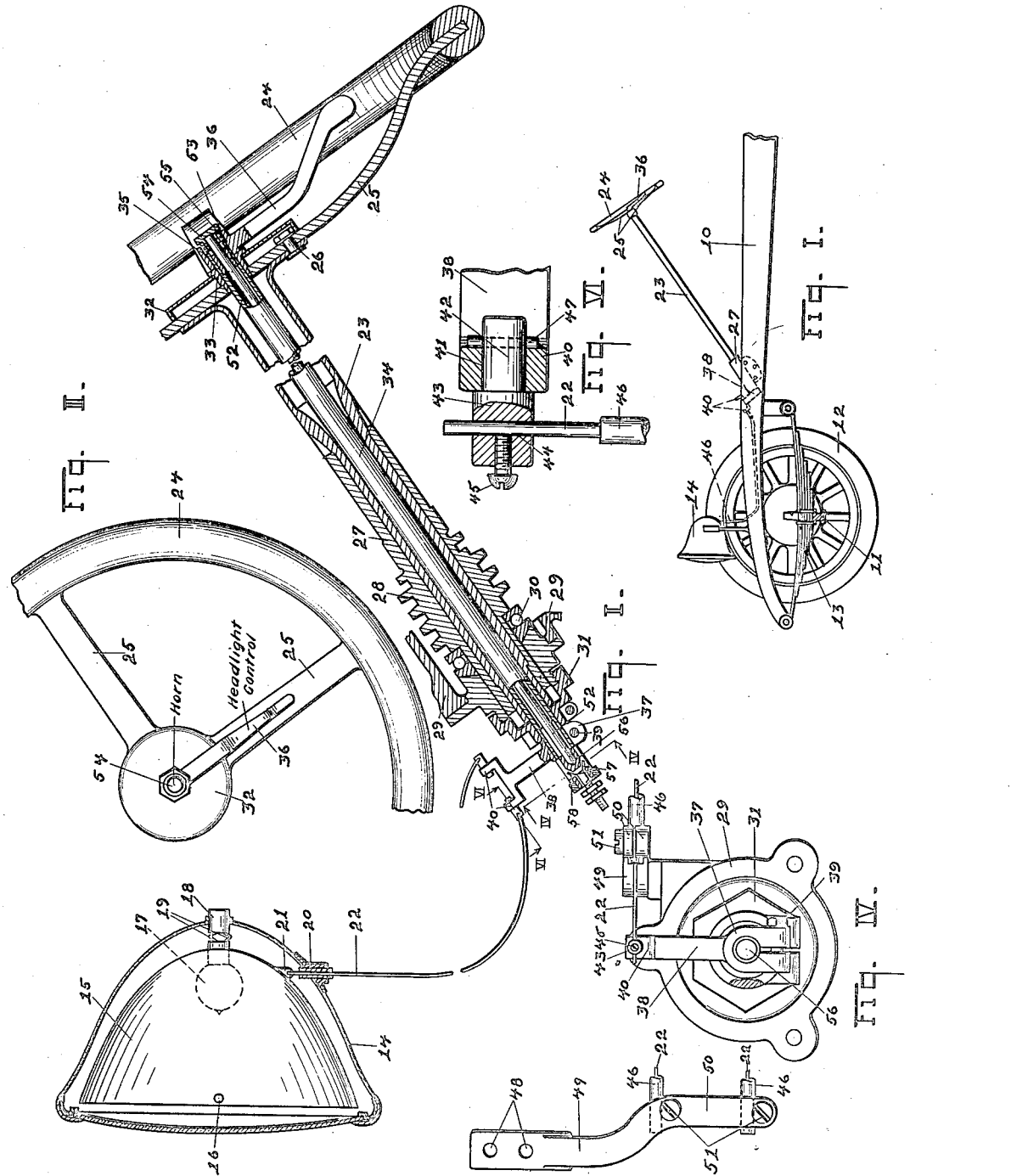

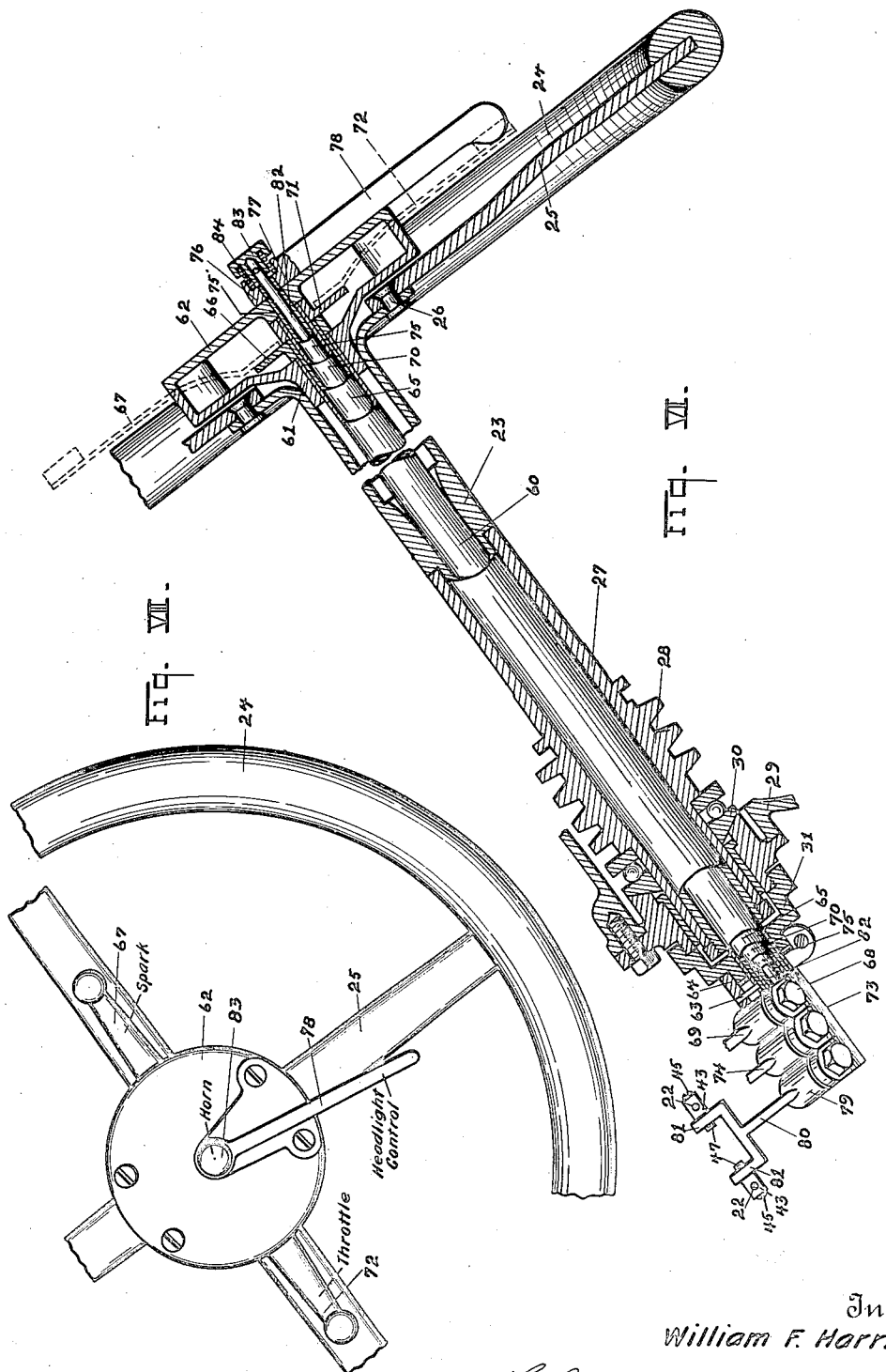

WILLIAM F. HARRINGTON, OF TOLEDO, OHIO, ASSIGNOR TO THE WILLYS-OVERLAND COMPANY, OF TOLEDO, OHIO, A CORPORATION OF OHIO.

HEADLIGHT-CONTROLLING MECHANISM.

1,421,775.

Specification of Letters Patent.  Patented July 4, 1922.

Application filed October 29, 1917. Serial No. 199,042.

*To all whom it may concern:*

Be it known that I, WILLIAM F. HARRINGTON, a subject of the King of Great Britain and Ireland, who have declared my intention to become a citizen of the United States, residing at Toledo, in the county of Lucas and State of Ohio, have invented certain new and useful Improvements in Headlight-Controlling Mechanism, of which I declare the following to be a full, clear, and exact description.

This invention relates to improvements in headlight controlling mechanism for motor vehicles.

The principal object of this invention is to provide an improved mechanism for controlling automobile headlights of the type which are provided with tilting reflectors and to provide means for tilting said reflector, which means shall be operable from the steering wheel of the vehicle.

A further object of my invention is to provide a mechanism for tilting the reflectors of automobile headlights which mechanism shall be readily accessible for operation by the driver and which shall be so designed that the connections between the tilting reflector and the operating mechanism shall be effectively concealed.

A further object of my invention is to provide an operating mechanism for automobile headlights of the tilting reflector type, in which the connections between the tilting reflector and the operating means is disposed within the steering column of the motor vehicle.

Further objects, and objects relating to economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawing, forming a part of this specification, in which—

Fig. I is a view in side elevation of the frame of a motor vehicle embodying my invention.

Fig. II is a view, partly in section and partly diagrammatic, showing a headlight controlling mechanism embodying my invention, the view showing a section through the steering column of a motor vehicle and through a headlight embodying my invention, the connection between the steering column and the tilting reflector being shown largely diagrammatically.

Fig. III is a top plan view of a steering wheel showing my headlight controlling mechanism in place thereon.

Fig. IV is a detail, sectional view, taken substantially on the line IV—IV of Fig. II.

Fig. V is a detail view in side elevation of the arm forming the support for the tubes enclosing the reflector actuating wires.

Fig. VI is a detail sectional view, taken substantially on the line VI—VI of Fig. II.

Fig. VII is a detail sectional view through a steering column, showing a slightly modified form of controlling mechanism, which is particularly adaptable to a steering column provided with spark and throttle control columns mounted rotatably and concentrically within said steering column.

Figs. VIII is a top plan view of the steering wheel shown in Fig. VII, showing my headlight controlling mechanism in place.

In the drawings, similar reference numerals refer to similar parts throughout the several views, and the sectional views are taken looking in the direction of the little arrows at the ends of the section line.

Considering the numbered parts of the drawing, I have shown a motor vehicle comprising the side members 10 of the frame, the front axle 11, wheels 12, and springs 13, connecting the frame and the front axle 11. The headlights 14 are mounted on the motor vehicle frame in the usual manner, and each is provided with a tilting reflector 15, mounted on the trunnions 16, so as to tilt on a horizontal axis. A light bulb 17 is carried by each reflector and connected with the connector 18 carried by the headlight casing 14, by means of the flexible connecting wires 19. A wire 22 is slidably mounted in a sleeve 20, carried by the casing 14, and connected at 21 to the reflector, so that, be movement of the wire 22, the reflector 15 may be tilted about its horizontal axis.

My invention has to do with the means for manipulating the wires 22, so as to tilt the reflectors. A steering column 23 is mounted on the motor vehicle in the usual manner, carrying at its upper end the steering wheel 24, the spider of which has the arms 25 connected at 26 to the upper end of the steering column 23. A worm sleeve 27 is secured on the lower end of the steering column 23, having the usual steering worm 28. The lower end of the steering column is journaled in the steering column support 29, and a thrust bearing 30 is provided between the lower end of the worm 28 and said steering column support. A cap 31 is threaded on said support so as to embrace the lower end of the steering column. A casing 32 is secured to the steering wheel spider at the upper end of the steering column and said casing 32 carries a central bushing 33 in which the upper end of the headlight control column 34 is journaled, said headlight control column being disposed within said steering column concentrically thereof and rotatably mounted therein. The hub 35 of a headlight control lever 36 is secured to the upper end of the headlight control column 34, outside of the casing 32, as is clearly shown in Figs. II and III.

The lower end of the headlight control column 34 projects beyond the cap 31, and the split hub 37 of an arm 38 is secured to the lower end of said column. The hub 37 of said arm 38 is split and embraces the lower end of said control column, the parts of said split hub being drawn together by the bolt 39, so as to clamp it about the lower end of the column. The arm 38 is forked, having the forks 40, which are somewhat spaced apart from each other. Each of the forks 40 is provided with an opening 41, extending transversely therethrough, and the pins 43 are each provided with a reduced end 42, journaled in the openings 41. An opening 44 extends transversely through the pin 43, and one end of the wire 22, which is connected to the tilting reflector 15, is inserted in the opening 44, and secured in place therein by means of the set screw 45. The pins 43 are secured in the forks of the arm 38 by means of the cotter pins 47, extending through the reduced ends 42 of the pins, as is clearly shown in Fig. VI of the drawing.

The wires 22 connecting the arm 38 and the tilting reflectors are disposed within flexible tubes 46, and the ends of these tubes adjacent the end of the steering column are supported by an arm 49 carried by the steering gear support 29 by means of bolts or screws passing through the openings 48 in the base of the arm 49. The free end of said arm 49 is split into the parts 50, which extend parallel to each other and are drawn toward each other by the screws 51, so as to clamp between them in suitable seats, which may be provided, the ends of the tubes 46, in which the wires 22 are disposed.

Rod 52 is slidably mounted within the headlight control column 23, the upper end of said rod projecting above the upper end of said control column and having secured thereto a head 54, forming a push button. The upper end of the rod 52 has a bearing in a bushing 53, disposed in the upper end of the headlight control column, and a spring 55 is compressed between the head 54 and the upper end of said headlight control column. The lower end of said rod 52 carries a block 56, which is adapted to bridge and make a contact between the contacts 57 and 58, which are included in separate branches of the horn circuit, so that when the rod 52 is moved longitudinally by pressing on the button 54, the horn circuit will be closed to sound the horn.

In Fig. VII and VIII, I have shown a slightly modified form of my device, which is especially adapted for constructions in which the spark and throttle levers are mounted on the steering wheel and in which spark and throttle control columns are housed within the steering column. In this form of my device, a column 60 is mounted within the steering column 23, as shown in Fig. VII of the drawing. The upper end of the column 60 is secured to the hub 61 of a casing 62, while the lower end of said column is secured by a pin 63 to an arm 64 projecting from the cap 31, closing the lower end of the steering column. A spark control column 65 is rotatably and concentrically mounted within the column 60 and the upper end of said spark control column is fastened to the hub 66 of the spark control lever 67. An arm 68 has its hub secured to the lower end of the spark control column 65 and carries an arm 69, which is connected with the spark controlling mechanism, so that the rotation of the column 65 will actuate the spark controlling mechanism.

A throttle control column 70 is housed within the spark control column 65, being rotatable with respect thereto. The upper end of the throttle control column 70 is connected to the hub 71 of the throttle control lever 72. Both the throttle control lever 72 and the spark control lever 67 project through slots formed in the side walls of the casing 62 in the usual manner. The hub 73 of an arm 74 is secured to the lower end of the throttle control column 70, said arm 74 being connected to the throttle controlling mechanism in the usual manner.

A headlight control column 75 is rotatably and concentrically mounted within the throttle control column 70 and the upper end of said headlight control column 75 has a bearing at 75′, in the casing 62. The upper end of said headlight control column is connected to the hub 77 of the headlight control lever 78. The lower end of the headlight control column 75 is connected to the hub 79 of an arm 80, which is provided with a forked end, each of the forks 81 of which is connected to a wire 22 leading to one of the tilting reflectors in the manner which I have just described with reference to the other form of my device.

A rod 82 is slidably mounted within the headlight control column 76 and provided with a head 83, serving as a push button. A spring 84 is disposed between said head 83 and the bottom of a recess provided in the hub 77 of the headlight control lever 78. The lower end of said rod is provided with means for closing a horn circuit as has been described with reference to the other form of my device.

From the description of the parts given above, the operation of this mechanism should be very readily understood. In Figs. I to VI inclusive, I have shown a form of my invention, which is especially adapted for use in connection with a steering column in which the spark and throttle control is not mounted on the steering wheel. In this form, the headlight control column 34 is rotatably mounted directly in the steering column 23. The headlight control column 34 may be rotated within the steering column 23 by means of the headlight control lever 34, and this rotation will move the arm 38 connected to the lower end of the column 34, in one direction or the other, so as to assert a pull upon the wires 22, which are connected to the tilting reflectors 15 of the headlights 14. The arm 38 is provided with the forks 40, each of which is connected with a wire leading to one of the reflectors, so that the rotation of the column 34 actuates the reflectors simultaneously to tilt them. The wires 22 are so connected to the forks 40 of the arm 38, that the latter may exert a straight pull upon them, and this is accomplished by means of the pins 43, which are swiveled in the arms 40. The wires 22 are adjustably connected to the pins 43 by means of the set screws 45. I also provide a support for the ends of the tubes 46, which enclose the wires 22, adjacent the arm 38, said support being preferably secured to the bottom of the steering gear support and adjacent the lower end of the steering column. This support comprises the arm 49, having the split end comprising the parts 50, between which the ends of the tubes 46 are clamped by means of the set screws 51. The headlight control column is rotatably mounted within the steering column and the push rod 52 for actuating and closing the horn circuit may be housed within the control column 34 and actuated by the push button 34 at the upper end thereof.

In the form of my invention, which I have shown in Figs. VII and VIII, the headlight control column 75 is rotatably and concentrically mounted within the spark and throttle control columns 65 and 70. It will be seen that these columns 65, 70 and 75 are telescoped relative to each other, with the inner columns projecting lower than the outer column so that the arms 69, 74 and 80 are arranged side by side, as shown in Fig. VII of the drawing. The operation of this form of my invention is the same as in the form which I have shown in Figs. I to VI of the drawing, and its operation will need no further description here.

I am aware that the particular embodiment of my invention, which I have here shown and described, is susceptible of considerable variation without departing from the spirit thereof, and, therefore, I desire to claim my invention broadly, as well as specifically, as indicated by the appended claims.

Having thus described my invention, what I claim as new and desire to secure by Letters Patent, is:

1. The combination with a motor vehicle provided with a steering column, of a headlight supported on said motor vehicle and provided with a reflector tiltable about a horizontal axis; a headlight control column disposed within said steering column; means for rotating said control column; and connections between said control column and said reflector, whereby the rotation of said control column will tilt the reflector.

2. The combination with a motor vehicle having a steering column, of a headlight mounted on the motor vehicle and provided with a tilting reflector; a headlight control column rotatably mounted in said steering column; means for rotating said control column; an arm secured to the lower end of said control column; and a flexible member secured at one end to the tilting reflector and at the other end to said arm.

3. The combination with a motor vehicle having a steering column, of a headlight mounted on said motor vehicle and provided with a tilting reflector; a headlight control column rotatably mounted in said steering column; means for rotating said control column; an arm secured to the lower end of said control column, a pin swiveled in the end of said arm and a flexible member connecting said tilting reflector and said pin.

4. The combination with a motor vehicle having a steering column, of a headlight mounted on said motor vehicle and provided with a tilting reflector; a control column rotatably mounted in said steering column; means for rotating said control column; an arm provided with a split hub embracing the lower end of said control column; and a flexible member connecting said tilting reflector and said arm.

5. The combination with a motor vehicle having a steering column, of a headlight mounted on said motor vehicle and provided with a tilting reflector; a control column rotatably mounted in said steering column; means for rotating said control column; an arm secured to the lower end of said control column; a flexible member connected at one end to said tilting reflector and at the other end to said arm; a flexible tube in which the said flexible member is disposed; and a support for one end of said flexible tube adjacent the lower end of said steering column.

6. The combination with a motor vehicle having a steering column, of a pair of headlights mounted on said motor vehicle and each provided with a tilting reflector; a headlight control column rotatably mounted in said steering column; means for rotating said control column; an arm secured to the lower end of said control column and having a forked end; and a flexible member connecting each tilting reflector to one fork of said arm.

7. The combination with a motor vehicle having a steering column, of a pair of headlights mounted on said motor vehicle and each provided with a tilting reflector; a headlight control column rotatably mounted in said steering column; means for rotating said control column; an arm secured to the lower end of said control column and provided with a forked end; a pin swiveled in each fork of said arm; and a flexible member connecting each tilting reflector with one of said pins.

8. The combination with a motor vehicle having a steering column, of a pair of headlights mounted on said motor vehicle and each provided with a reflector tiltable about a horizontal axis; spark and throttle control columns rotatably and concentrically mounted within said steering column; a headlight control column rotatably mounted within said spark and throttle control columns; means for rotating said headlight control column; an arm secured to the lower end of said headlight control column; and connections between said arm and each of said tilting reflectors.

9. The combination with a motor vehicle having a steering column, of a headlight mounted on said motor vehicle and provided with a tilting reflector; spark and throttle control columns rotatably and concentrically mounted within said steering column; a casing carried at the upper end of said steering column, the upper ends of said spark and throttle control columns being disposed within said casing; a headlight control column rotatably mounted within said spark and throttle control columns, the upper end of said headlight control column being journaled in said casing; means for rotating said headlight control column; and connections between the lower end of said column and said tilting reflector.

10. The combination with a motor vehicle having a steering column, of a headlight mounted on said motor vehicle and provided with a reflector tiltable about a horizontal axis, a headlight control column rotatably mounted in said steering column, means for rotating said control column, an arm secured to the lower end of said control column, a flexible member connected to said tilting reflector, and a movable connection between said flexible member and said arm.

11. The combination with a motor vehicle provided with a steering column, a lamp casing fixed upon said motor vehicle, a reflector pivotally mounted in said casing, a cable extending through said casing and connected with said reflector and means extending through said steering column and connected with said cable for actuating said reflector.

12. The combination with a motor vehicle provided with a steering column, a lamp casing fixed upon said motor vehicle, a reflector pivotally mounted in said casing, a cable extending through said casing and connected to said reflector, a rod having its opposite ends projecting through said steering column, an arm upon the lower end of said rod connected to said cable and means connected to the upper end of said rod for actuating the same.

In testimony whereof I affix my signature

WILLIAM F. HARRINGTON